(12) United States Patent
Thebault et al.

(10) Patent No.: US 8,357,423 B2
(45) Date of Patent: Jan. 22, 2013

(54) METHOD FOR MAKING A REFRACTORY CARBIDE LAYER ON A PART MADE OF C/C COMPOSITE MATERIAL

(75) Inventors: Jacques Thebault, Bordeaux (FR); Christian Robin-Brosse, Le Haillan (FR); Aurélie Quet, Saint Medard en Jalles (FR); René Pailler, Cestas (FR)

(73) Assignees: Snecma Propulsion Solide, Le Haillan Cedex (FR); Centre National de la Recherche Scientifique, Paris (FR)

( * ) Notice: Subject to any disclaimer, the term of this patent is extended or adjusted under 35 U.S.C. 154(b) by 323 days.

(21) Appl. No.: 12/747,275

(22) PCT Filed: Dec. 12, 2008

(86) PCT No.: PCT/FR2008/052289
§ 371 (c)(1),
(2), (4) Date: Sep. 28, 2010

(87) PCT Pub. No.: WO2009/081006
PCT Pub. Date: Jul. 2, 2009

(65) Prior Publication Data
US 2011/0017353 A1    Jan. 27, 2011

(30) Foreign Application Priority Data
Dec. 13, 2007    (FR) ..................... 07 59802

(51) Int. Cl.
*C23C 20/08*    (2006.01)
*C23C 20/00*    (2006.01)

(52) U.S. Cl. ........ 427/199; 427/180; 427/202; 427/204; 427/205

(58) Field of Classification Search .................. 427/180, 427/199, 202, 204, 205
See application file for complete search history.

(56) References Cited

U.S. PATENT DOCUMENTS
5,021,107 A * 6/1991 Holko ................ 156/89.25
2004/0207133 A1 10/2004 Williams et al.
2007/0172659 A1 7/2007 Shao

* cited by examiner

*Primary Examiner* — Lois Zheng
(74) *Attorney, Agent, or Firm* — Weingarten, Schurgin, Gagnebin & Lebovici LLP

(57) ABSTRACT

The invention relates to a method of making a refractory carbide layer on the accessible surface of a C/C composite material, the method including a step consisting in placing the composite material in contact with a reactive composition in solid form that contains an atomic proportion greater than or equal to one-third and less than or equal to 95% of a metal that is a precursor of a determined carbide having a melting temperature greater than 2000° C., and an atomic proportion of silicon that is greater than or equal to 5% and less than or equal to two-thirds. The method further includes a step consisting in impregnating the accessible surface of the C/C composite material with the reactive composition melted at a temperature that is greater than or equal to the melting temperature of the metal that is a precursor of a determined carbide.

9 Claims, 3 Drawing Sheets

METHOD FOR MAKING A REFRACTORY CARBIDE LAYER ON A PART MADE OF C/C COMPOSITE MATERIAL

BACKGROUND OF THE INVENTION

The present invention relates to protecting carbon/carbon (C/C) thermostructural composite materials against attack in an aggressive medium.

C/C composite materials are well known and they are used for their thermal properties (refractoriness of carbon) and in particular for the excellent mechanical behavior they present even at high temperature. Nevertheless, such materials present the drawback of being porous and of being corroded by any corrosive agent that is active with respect to the element carbon.

C/C composite materials are used in particular for forming parts that are to be subjected to high temperatures, such as the nozzles of rocket engines, airplane brake disks, the walls of nuclear reactors (fission, fusion), atmospheric reentry devices, etc. While such C/C composite material parts are in use, it is very important to prevent the carbon that is exposed at the "accessible surface" of the part from interacting with oxidizing species, and above all with the corrosive agents that are present. The term "accessible surface" is used to mean all of the outside surface of the part including the surfaces of pores that are inside the material and that open to the outside, i.e. including the pores that are accessible to the corrosive medium from the outside.

In order to protect this accessible surface of the material, one well-known solution consists in causing a molten metal to react with the carbon that is present so as to obtain a carbide layer. The metal is selected so that it generates a carbide that withstands the corrosive medium under consideration and that is stable at high temperature, such as silicon carbide, which is obtained by causing the carbon of the material to react with molten silicon. In order to protect the C/C material, it is desired more particularly to form carbides that are highly refractory, also referred to as ultra-refractory carbides, i.e. carbides that present melting temperatures higher than 2000° C., such as titanium carbide (TiC), zirconium carbide (ZrC), niobium carbide (NbC), and hafnium carbide (HfC). These carbides are obtained from the corresponding metals raised to their melting temperatures, e.g. by using the well-known method of reactive melt infiltration (RMI).

FIGS. 1A and 1B show the result that is obtained after infiltrating a C/C composite material with molten zirconium. As can be seen on the portion of material shown in FIGS. 1A and 1B, a layer of zirconium carbide (ZrC) is indeed obtained on the carbon surface that is accessible to the molten zirconium as a result of the reaction $Zr+C \rightarrow ZrC$. By way of example, the document by L. M. Adelsberg et al., "Kinetics of the zirconium-carbon reaction at temperatures above 2000° C.", Transactions of the Metallurgical Society of AIME, 1966, No. 236, pp. 972-977, describes the reaction of zirconium with carbon at about 2000° C., with zirconium carbide being formed.

The metallographic sections shown in FIGS. 1A and 1B show that there is a bonding defect between the layer of zirconium carbide formed on the carbon of the material. The decohesion (corresponding to the black zones between the carbon and the ZrC in FIGS. 1A and 1B) constitutes a preferred passage for one or more corrosive agents, and consequently for the carbon of the C/C material part being attacked during subsequent use thereof.

Methods have been developed that attempt to connect the carbide layer with the carbon of the material. In particular, document US 2004/0207133 proposes performing an initial RMI reactive infiltration using a refractory metal to form the desired carbide, and subsequently performing a second RMI reactive infiltration operation with silicon on its own in order to fill the spaces that result from the decohesion with a secondary layer of silicon carbide obtained by reaction between the molten silicon and the accessible carbon. Nevertheless, apart from the fact that that method requires second heat treatment of the material at high temperature, thereby giving rise to extra fabrication costs, the Applicant has found that even when forming such an SiC layer after the initial carbide has been formed, it is not possible to obtain good bonding between the various layers, in particular in terms of structural and thermal continuity of the bonding.

The Applicant has observed that the decohesion between the carbon of the composite material and the carbide occurs during the cooling of the molten metal deposited on and in the material. The difference in thermal expansion coefficients between the molten metal and the composite material may be at least partially responsible for this decohesion.

OBJECT AND SUMMARY OF THE INVENTION

An object of the invention is to provide a method enabling an ultra-refractory carbide layer to be formed on the accessible carbon of a C/C composite material in a single treatment operation, and without decohesion between the carbon of the C/C composite material and the carbide that has been formed.

This object is achieved by a method comprising a step consisting in placing the C/C composite material in contact with a reactive composition in solid form containing an atomic proportion greater than or equal to one-third and less than or equal to 95% of a metal that is a precursor of a determined carbide that has a melting temperature higher than 2000° C. (ultra-refractory carbide), and an atomic proportion of silicon that is greater than or equal to 5% and less than or equal to two-thirds, and a step that consists in impregnating the accessible surface of the C/C composite material with the reactive composition melted by application of heat treatment performed at a temperature that is higher than or equal to the melting temperature of said metal that is a precursor of a determined carbide so as to form a first phase of silicon carbide in contact with the C/C composite material and a second phase of the determined carbide. These carbide phases are formed solely by reaction with the carbon of the material.

Thus, by using a composition comprising at least 5% silicon with the carbide precursor metal and by causing said composition to react with the carbon of the treated material at a temperature that is greater than the melting temperature of the metal, a single operation suffices to form two carbide phases comprising a first phase of silicon carbide on the carbon followed by a second phase of ultra-refractory carbide. By virtue of the formation of a silicon carbide phase that adheres strongly to the carbon of the material, the appearance of decohesion is avoided at the surface of the treated carbon, so there is no longer any decohesion that can be reached by corrosive or oxidizing agents.

In addition, the layers of silicon carbide and of ultra-refractory carbide that are obtained form a double layer that is continuous going from the carbon of the material to the layer of ultra-refractory carbide. This continuity is both structural and thermal. The thermal continuity serves in particular to increase the ability of the material to withstand high temperatures.

According to a particular aspect of the invention, the reactive composition comprises a metal selected from at least: titanium, zirconium, niobium, hafnium, tantalum, and tungsten.

According to another aspect of the invention, the method of the invention may advantageously be implemented with reactive compositions based on defined compounds such as a metal disilicide selected from at least: $TiSi_2$, $ZrSi_2$, $NbSi_2$, $HfSi_2$, $TaSi_2$, and $WSi_2$.

According to yet another aspect of the invention, the reactive composition may further include a third element. This third element may be selected so as to impart particular properties to the material. In particular, the third element may be selected to act during subsequent oxidation so as to form a protective layer having particular characteristics. Under such circumstances, the third element may be aluminum. It is also possible to select an element such as calcium or yttrium that serves to stabilize the reaction products stemming from the metal that is a precursor of the ultra-refractory carbide.

The reactive composition may also contain a melting additive such as tin or copper that does not react with carbon and that has a melting temperature that is lower than that of said carbide precursor metal.

BRIEF DESCRIPTION OF THE DRAWINGS

Other characteristics and advantages of the invention appear from the following description of particular embodiments of the invention, given as non-limiting examples, and with reference to the accompanying drawings, in which.

DETAILED DESCRIPTION OF IMPLEMENTATIONS

Figure 1A:
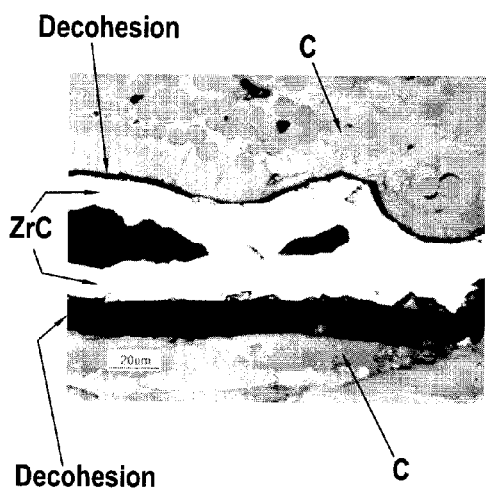
FIGS. 1A and 1B are photomicrographs showing a C/C composite material treated with molten zirconium.
Figure 1B:
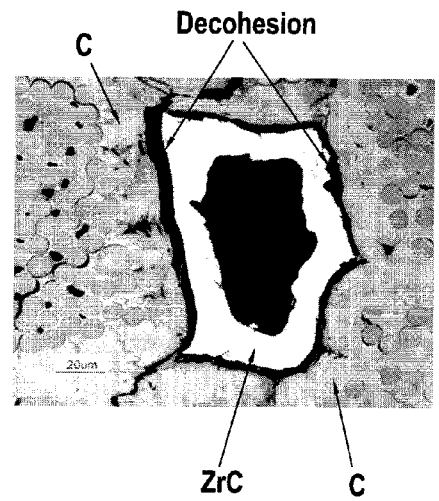

The method of the present invention proposes a solution for forming at least one highly refractory carbide layer on the "accessible surface" of a part made of carbon/carbon (C/C) composite material. The term "accessible surface" is used to mean not only the outside surface of the part, but also the surfaces of pores inside the material and that open to the outside, i.e. the pores that are accessible from the outside. As described in detail below, it is this accessible surface that is put into contact with a molten reactive composition specific to the invention in order to obtain a reaction between the metal (s) present in the composition and the accessible carbon, both on the outside and on the inside of the C/C material.

Fabricating parts out of C/C composite material is well known. It generally comprises making a carbon fiber preform of a shape close to that of the part that is to be fabricated, and densifying the preform with the carbon matrix.

The fiber preform constitutes the reinforcement of the part and it performs a role that is essential in terms of mechanical properties. The preform is obtained from fiber textures: yarns, tows, braids, woven fabrics, felts, . . . . Shaping is performed by winding, weaving, stacking, and possibly also needling two-dimensional plies of fabric or sheets of tows, . . . .

The fiber reinforcement may be densified by a liquid technique (impregnating with a resin that is a precursor for the carbon matrix, and transforming the resin by cross-linking and pyrolysis, which process may be repeated) or by a gaseous technique (chemical vapor infiltration (CVI) of the carbon matrix).

At this stage of fabrication, the C/C material constituting the part still presents pores, including some that are accessible from the outside.

Once the C/C composite material part has been made, it is impregnated with a molten reactive composition that, in accordance with the present invention, contains at least 5% to two-thirds in atomic percentage or proportion of silicon, and one-third to 95% of a metal suitable for reacting with the carbon of the material of the part to form a carbide that is highly refractory or ultra-refractory, i.e. that has a melting temperature greater than 2000° C. Of the metals that are suitable for forming such a carbide, the composition of the invention may contain in particular any of the following metals: titanium, zirconium, niobium, hafnium, tantalum, and tungsten.

Tests carried out by the Applicant and described below have shown that compositions containing a large quantity of silicon such as disilicides of the metal that is the precursor of the ultra-refractory carbide also enable the same results to be obtained, i.e. structural and thermal continuity between the carbon of the material, the SiC layer, and the carbide layer. This makes it possible in particular for the method of the invention to be capable of being implemented by using defined compounds as the reactive composition, such as for example, for zirconium: zirconium disilicide ($ZrSi_2$), or for titanium: titanium disilicide ($TiSi_2$).

In order to impregnate the accessible surface of the C/C composite material with the reactive composition of the invention, the well-known method of reactive melt infiltration (RMI) is used, which method consists in impregnating the C/C material of the part with the composition in a molten state. For this purpose, the C/C composite material part may be placed in a graphite crucible with its top portion carrying the composition in solid form, e.g. in powder form. When it is difficult to keep the composition in powder form on the part before initiating the heat treatment, the grains of powder may be bonded by means of a sacrificial resin having zero coke content. Once the composition in solid form has been placed on the part, heat treatment is then applied to melt the composition so that it impregnates the accessible surface of the material by making contact with its outside surface and infiltrating into the pores of the part.

According to the invention, no external carbon is supplied, such that the layers or phases of SiC and of ultra-refractory carbide are formed solely by reaction with the carbon of the C/C composite material, thus making it possible in particular to form the SiC layer/phase in continuous contact with the accessible surface of the material, thereby avoiding decohesion between the material and the carbon layers/phases. For this purpose, the reactive composition in solid form, as used in the invention, does not contain carbon or a carbon precursor. In addition, when the reactive composition is applied with a binder, a sacrificial resin is used having a zero coke content as mentioned above, which resin evaporates fast enough during the heat treatment to ensure that none of the carbon that may be present therein reacts with the reactive composition. By way of example, as sacrificial resin it is possible for this purpose to use polyvinyl alcohol, polymethyl methacrylate (PMMA), water, etc.

In accordance with the present invention, the heat treatment is performed at a temperature higher than the melting temperature of the metal used in the reactive composition as a precursor for the ultra-refractory carbide. The Applicant has observed that if the heat treatment temperature is higher than the melting temperature of the reactive composition used, but lower than the melting temperature specific to the metal of the composition, then the two distinct phases of carbide, as described below, are not formed.

Figure 2:
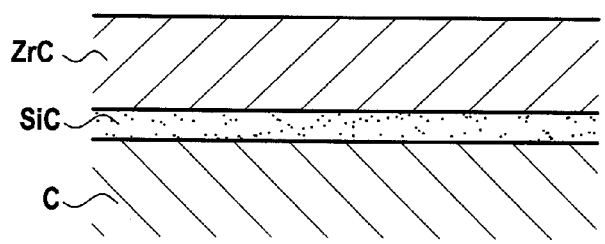
FIG. 2 shows the formation of an ultra-refractory carbide layer obtained in accordance with the method of the invention.

FIG. 2 shows the result obtained after a C/C composite material part has been infiltrated with a reactive composition containing zirconium and silicon (Zr—Si), the composition having been melted at a temperature higher than the melting temperature specific to zirconium. This figure shows that in a single heat treatment operation, i.e. in a single reactive infiltration operation, at least two layers of carbide are obtained in two distinct phases, i.e. an adherent silicon carbide (SiC) layer in contact with the carbon of the C/C composite material of the part, and a layer of zirconium carbide (ZrC) overlying the SiC layer.

Figure 3:
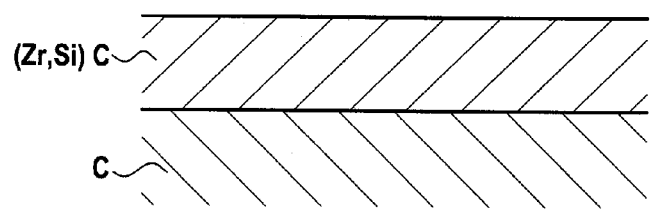
FIG. 3 is a diagrammatic example of a theoretical result after infiltrating a C/C composite material with a molten composition of zirconium and of silicon.

Obtaining these two layers of carbide in two distinct phases is surprising insofar as the usual reaction mechanisms generally lead to a single mixed carbide phase being formed, i.e. in the example considered here, a mixed zirconium and silicon carbide ((Zr, Si)C), as shown in FIG. 3.

Figure 4:
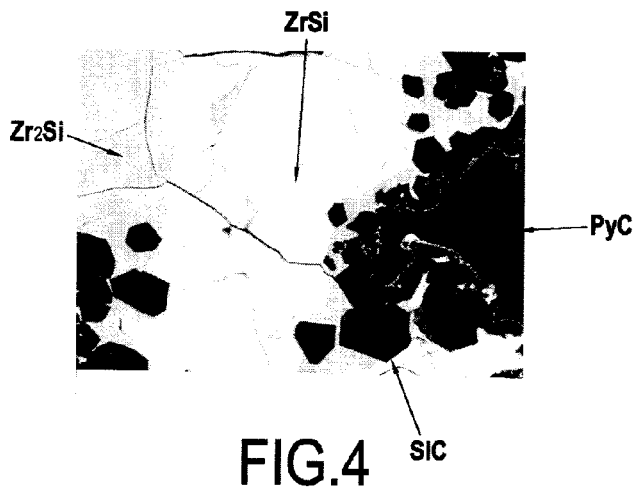
FIG. 4 is a photomicrograph showing the results obtained after infiltrating a C/C composite material with a $ZrSi_2$ composition heated to 1650° C.
Figure 5:
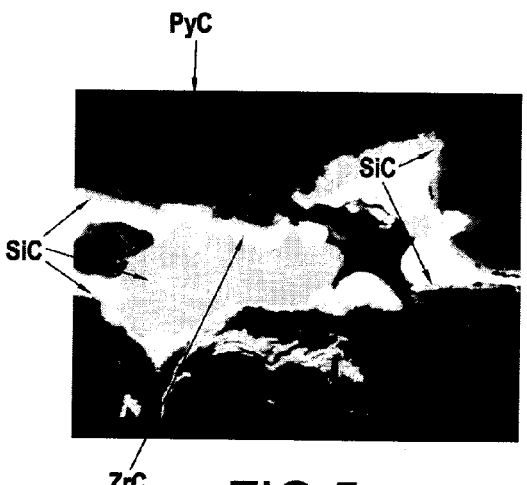
FIGS. 5 and 6 are respectively a photomicrograph and a diagram showing the results obtained after infiltrating a C/C composite material with a $ZrSi_2$ composition heated to 1900° C. in accordance with the method of the invention.
Figure 6:
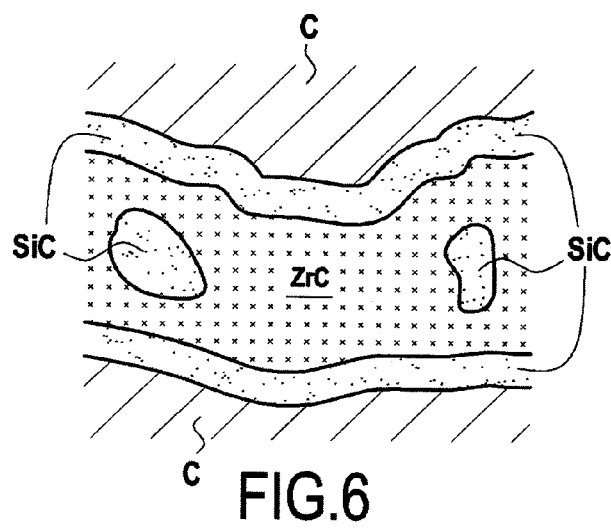

The Applicant has carried out tests that show that with zirconium disilicide ($ZrSi_2$) which melts at 1520° C., the heat treatment needs to be carried out at a temperature higher than 1852° C., corresponding to the melting temperature of zirconium on its own, in order to obtain an SiC phase close to the carbon of the material with a ZrC phase overlying the SiC phase. More precisely, the Applicant has treated a C/C composite material with $ZrSi_2$, the heat treatment for melting the compound having two pauses at different temperatures, i.e. a first pause of 30 minutes (min) at 1650° C., followed by a second pause for 30 min at 1900° C. At the end of the first pause at 1650° C., SiC has formed but only in the form of discontinuous grains, as shown in FIG. 4, which does not make it possible to ensure continuity between the various phases. In addition, the zirconium is present only in the form of silicides (ZrSi or $Zr_2Si$). In contrast, after the pause at 1900° C., only the two SiC and ZrC phases are to be observed, as shown in FIG. 5. Since these two phases are always sequenced in the same order, i.e. a continuous SiC layer adherent on the carbon of the material and a ZrC phase containing excess silicon in the form of areas of SiC in the ZrC (FIG. 6).

Similarly, when using titanium disilicide ($TiSi_2$) as the reactive composition, the melting temperature of this compound is 1540° C. while the melting temperature of titanium on its own is 1687° C. If the $TiSi_2$-based reactive composition is heated only to a temperature that is greater than 1540° C. but lower than 1687° C., then a mixed $Ti_3SiC_2$ carbide is obtained, but not two distinct phases of carbide with the SiC phase closer to the carbon of the C/C material.

If reference is made to the well-known phase diagrams for binary metal-Si mixtures, and more particularly to the binary diagrams for a system comprising a metal such as Zr, Ti, Nb, Hf, Ta, or W, with an atomic proportion of silicon lying in the range 0% to 100%, such as those given in the work by Max Hansen entitled "Constitution of binary alloys", McGraw-Hill (1958), it can be seen that there does not exist a eutectic mixture with 5% silicon (atomic proportion). However, by infiltrating the C/C composite material with a composition containing an atomic proportion of 5% silicon and 95% zirconium or titanium, for example, (a composition for which there is no eutectic mixture using this percentage of silicon), and by heating this composition to a temperature higher than the melting temperature of the zirconium or of the titanium, in accordance with the method of the invention, then two sequenced phases of SiC and ZrC are indeed obtained with continuity from the carbon of the material to the ZrC layer.

Furthermore, even if a sufficient atomic proportion of silicon is used for there to exist a eutectic mixture, such as the minimum atomic proportion of 8.8% silicon in a Zr—Si composition, infiltration performed at the melting temperature of the mixture, here 1600° C., still does not enable two distinct continuous and sequenced phases of SiC and ZrC to be obtained.

Consequently, by using less than 5% silicon with the metal that is a precursor for the highly refractory carbide that it is desired to obtain, and by heating said composition to a temperature higher than or equal to the melting temperature specific to the metal, two distinct carbide phases are formed, with the SiC phase directly in contact with the accessible carbon of the material. Since the ultra-refractory carbide phase is no longer directly in contact with the carbon of the material, the formation of decohesion zones between the carbon of the material and the ultra-refractory carbide is avoided, where such zones would be formed if the C/C material were to be impregnated solely with the metal that is a precursor of the refractory carbide. By eliminating in this way the preferred passages for subsequent attacks by corrosive agents, the protection provided for the carbon of the C/C material is increased.

In addition, although using the reactive composition of the invention with a C/C material leads to two layers being formed in succession, respectively an SiC layer and a layer of ultra-refractory carbide, a continuous multilayer system is nevertheless obtained going from the carbon of the material to the layer of ultra-refractory carbide. This continuity is both structural and thermal. The structural continuity serves in particular to prevent corrosive species from reaching the carbon of the material, while the thermal continuity serves to increase the ability of the material to withstand high temperatures. Thermal diffusivity has been measured on a C/C material after reactive infiltration thereof with a $ZrSi_2$ composition in accordance with the method of the invention. Before infiltration, the material presented thermal diffusivity of 284 square millimeters per second ($mm^2$/s). After infiltration, i.e. after silicon carbide and zirconium carbide phases had been formed on the material, it presented thermal diffusivity of 292 $mm^2$/s. These measurements show that in spite of two carbide phases being formed, thermal continuity is indeed maintained.

Figure 7:
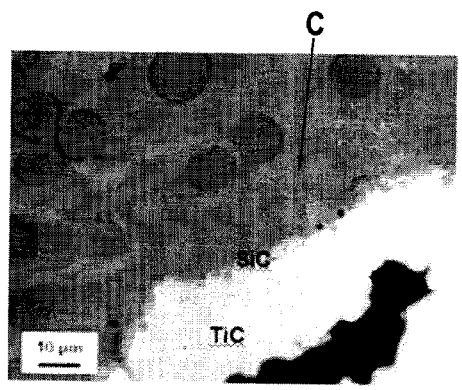
FIG. 7 is a photomicrograph showing the formation of a layer of titanium carbide obtained in accordance with the method of the invention.

Furthermore, tests with metals that are precursors of ultra-refractory carbides, other than zirconium, have likewise given good results in terms of continuity of the bond between the carbon of the material and the resulting carbide. FIG. 7 shows the result obtained after reactive infiltration of a C/C composite material with a composition comprising titanium and 20% silicon (atomic percentages), which composition was heated to 1700° C. It can be seen that the SiC layer is well anchored on the carbon of the material and thus provides continuity between the titanium carbide TiC and the carbon.

The reactive composition used in the present invention may contain one or more additional active elements over and above the silicon and the metal that is a precursor of the ultra-refractory carbide.

Figure 8:
FIG. 8 is a photomicrograph showing the results obtained after infiltrating a C/C composite material with a Ti—$Al_{10\%at}$—$Si_{10\%at}$ composition heated to 1900° C. in accordance with the method of the invention.

FIG. 8 shows the result obtained after reactive infiltration of a C/C composite material with a $Zr-Al_{10\%at}-Si_{10\%at}$ composition, the heat treatment for melting the composition being performed at 1900° C. After such infiltration, it is observed that the accessible carbon of the material has formed thereon a system of three continuous layers comprising, in order going from the carbon: a layer of SiC bonded to the carbon of the material, a layer of mixed carbide $(Zr-Al)C$, and a layer of ZrC. It can be seen that adding a third element, here aluminum, forms a mixed carbide with the carbide precursor metal, here zirconium.

Figure 9:
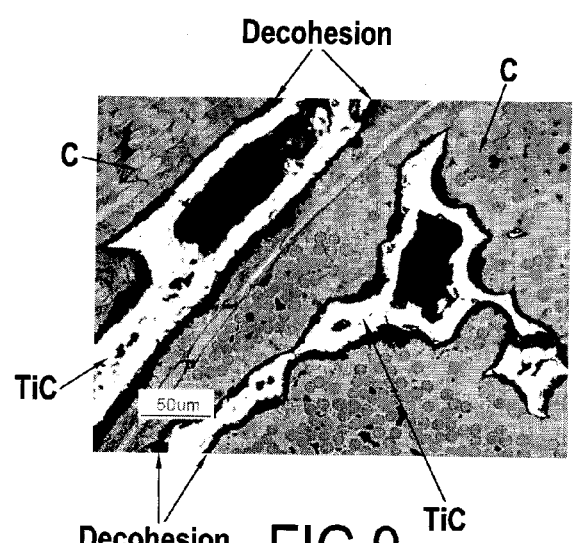
FIG. 9 is a photomicrograph showing the results obtained after infiltrating a C/C composite material with a Ti—$Al_{6\%at}$—$V_{4\%at}$ composition heated to 1700° C.

Similarly, when using a carbide precursor metal on its own, i.e. without silicon, the use of an alloy containing a precursor metal and an additional element other than silicon does not enable an ultra-refractory carbide layer to be obtained without decohesion. In particular, the Applicant has performed tests that consisted in infiltrating a C/C composite material with a $Ti-Al_{6\%at}-V_{4\%at}$ titanium alloy that did not contain any silicon, with the heat treatment for melting the composition being performed at 1700° C., i.e. a temperature higher than the melting temperature of titanium (1687° C.) The result of that testing is shown in FIG. 9 where it can be seen that titanium carbide (TiC) was indeed formed, but that there was decohesion between the TiC and the carbon of the material.

The third element used in the reactive composition of the method of the invention may be selected in particular by specific characteristics or properties that it is desired to impart to the C/C material. For example, for a C/C composite material part treated with a $Zr-Al_{10\%at}-Si_{10\%at}$ alloy, as described above with reference to FIG. 8, the use of said part at high temperature, e.g. in a rocket engine or in an atmospheric reentry shield, gives rise to oxidation of the zirconium carbide so as to generate a refractory oxide layer of zirconia $(ZrO_2)$, while the third element, i.e. Al, also oxidizes to form alumina $(Al_2O_3)$. Thus, under such circumstances, the protective layer obtained during oxidation is situated in the $Al_2O_3-ZrO_2$ system which possesses its own specific characteristics, e.g. in comparison with a protective layer formed solely of zirconia $(ZrO_2)$.

Consequently, by using a ternary composition in the method of the invention and by selecting a specific third element for the composition, it is possible to act not only on the nature and the characteristics of the carbide that is obtained directly after reactive infiltration of the material with the reactive composition, but also on the characteristics of derived reaction products, such as those formed during subsequent oxidation.

By way of example, the zirconia $(ZrO_2)$ that forms during oxidation of zirconium carbide is known as being a good refractory insulator. Nevertheless, it presents the defect of possessing a martensitic phase change with a sudden change in volume that gives rise to spontaneous ruptures within the zirconia layer. In order to mitigate that problem, it is known to associate yttrium oxide or calcium oxide with the zirconia. In the context of the invention, it is thus possible to use a $Zr-Si_{\geq 5\%at}-Y$ alloy or a $Zr-Si_{\geq 5\%at}-Ca$ alloy in accordance with the method of the invention to form a layer of SiC followed by a layer of ZrC on the carbon of the material, but with the element Y or Ca being present in the layer of ZrC so that during subsequent oxidation, the zirconia will be generated simultaneously with its stabilizing oxide, i.e. $ZrO_2+Y_2O_3$ or $ZrO_2+CaO$.

As described above, the method of the invention implements a reaction between the carbon present at the accessible surface of a C/C composite material part with a reactive composition containing a metal that is a precursor of a determined carbide, at least 5% silicon, and possibly one or more elements serving to modify the composition of the resulting carbide and of products that are formed subsequently, e.g. during use of the part in an oxidizing environment. The heat treatment that enables the composition to be melted and that enables it to react with the carbon needs to be performed at a temperature that is higher than the melting temperature of the metal that is a precursor of the ultra-refractory carbide.

The molten reactive composition must be capable of being put into contact with the carbon of the material not only as present at the surface of the part, but also with its carbon that is exposed in open pores, i.e. the carbon that is present inside the part and that is accessible from its outside surface. Methods of implementing reactive infiltration of a material with a molten alloy are well known. As described above, they may consist in particular in placing the composite material part directly in contact with the reactive composition in solid form and then in causing the alloy to melt by heat treatment.

The flow of the molten reactive composition into the material may be controlled and channeled, where necessary, by localized application of a non-reactive, anti-wetting composition, e.g. based on boron nitride (BN). One or more outside faces of a composite material part may be covered in such an anti-wetting composition, for example, so as to prevent the molten reactive composition from overflowing outside the part, and thus constraining it to impregnate the material thoroughly throughout its thickness.

In another variant implementation of the method of the invention, it is possible to use a melting additive that does not react with carbon, which additive serves to lower the melting temperature of the alloy and the temperature of the reaction. Amongst known additives, it is possible in particular to use tin, which melts at low temperature and which presents low vapor pressure. Tin is also known for dissolving numerous elements, including zirconium, silicon, and titanium. It is thus well adapted for being incorporated in the reactive composition of the invention and thus for acting as a fluxing agent encouraging the transport of the species of the composition (in particular silicon and the carbide precursor metal) to the zone for reaction with the exposed carbon that is to be treated. Copper also constitutes another example of a melting additive suitable for acting as a fluxing agent in the method of the invention.

The invention claimed is:

1. A method of making at least one layer of refractory carbide on a accessible surface of a carbon/carbon composite material, the method being characterized in that it comprises:
   a step of placing the composite material in contact with a reactive composition in solid form containing an atomic proportion greater than or equal to one-third and less than or equal to 95% of a refractory metal that is a precursor of a determined carbide that has a melting temperature higher than 2000° C., together with an atomic proportion of silicon that is greater than or equal to 5% and less than or equal to two-thirds; and
   a step of impregnating the accessible surface of the carbon/carbon composite material with the reactive composition melted by applying heat treatment at a temperature higher than or equal to the melting temperature of said refractory metal that is a precursor of a determined carbide so as to form a first phase of silicon carbide in contact with the carbon/carbon composite material, and a second phase of the determined carbide;

and wherein said first and second phases are formed solely by reaction with the carbon of the carbon/carbon composite material.

2. A method according to claim 1, characterized in that the reactive composition comprises a metal selected from the group consisting of titanium, zirconium, niobium, hafnium, tantalum, and tungsten.

3. A method according to claim 1, characterized in that the reactive composition comprises a metal disilicide selected from the group consisting of $TiSi_2$, $ZrSi_2$, $NbSi_2$, $HfSi_2$, $TaSi_2$, and $WSi_2$.

4. A method according to claim 1, characterized in that the reactive composition further includes a third element.

5. A method according to claim 4, characterized in that the reactive composition contains zirconium, and in that the third element is selected from the group consisting of aluminum, calcium, and yttrium.

6. A method according to claim 1, characterized in that, prior to placing the carbon/carbon composite material in contact with the reactive composition, one or more external portions of the carbon/carbon composite material are covered in an anti-wetting agent.

7. A method according to claim 1, characterized in that the reactive composition further contains a melting additive that does not react with carbon and that has a melting temperature that is lower than that of said refractory metal.

8. A method according to claim 7, characterized in that the melting additive is selected from the group consisting of tin and copper.

9. A method according to claim 2, characterized in that:

the reactive composition comprises a metal disilicide selected from the group consisting of $TiSi_2$, $ZrSi_2$, $NbSi_2$, $HfSi_2$, $TaSi_2$, and $WSi_2$;

the reactive composition further includes a third element;

the reactive composition contains zirconium, and in that the third element is selected from the group consisting of aluminum, calcium, and yttrium;

prior to placing the carbon/carbon composite material in contact with the reactive composition, one or more external portions of the carbon/carbon composite material are covered in an anti-wetting agent;

the reactive composition further contains a melting additive that does not react with carbon and that has a melting temperature that is lower than that of said refractory metal; and the melting additive is selected from the group consisting of tin and copper.

* * * * *

UNITED STATES PATENT AND TRADEMARK OFFICE
CERTIFICATE OF CORRECTION

PATENT NO. : 8,357,423 B2  Page 1 of 1
APPLICATION NO. : 12/747275
DATED : January 22, 2013
INVENTOR(S) : Jacques Thebault et al.

It is certified that error appears in the above-identified patent and that said Letters Patent is hereby corrected as shown below:

In the Specification

Column 7, line 64, "Zr-Si$_{\geq 5\%at}$-Y alloy or a Zr-Si$_{\geq 5\%at}$-Ca" should read as follows:

--Zr-Si$_{\geq 5\%at}$-Y alloy or a Zr-Si$_{\geq 5\%at}$-Ca--.

Signed and Sealed this
Twenty-sixth Day of November, 2013

Margaret A. Focarino
*Commissioner for Patents of the United States Patent and Trademark Office*